United States Patent [19]
Depoix

[11] 3,992,228
[45] Nov. 16, 1976

[54] ELECTRIC PRIMARY CELL COMPRISING A VISUAL INDICATOR OF ITS STATE OF CHARGE

[75] Inventor: Pierre Depoix, Poitiers, France

[73] Assignees: Saft - Societe des Accumulateurs Fixes et de Traction, Romainville; Compagnie Industrielle des Piles Electriques "Cipel", Levallois-Perret, both of France

[22] Filed: Oct. 23, 1975

[21] Appl. No.: 625,201

[30] Foreign Application Priority Data
Oct. 31, 1974 France .......................... 74.36411

[52] U.S. Cl. ................................................. 429/90
[51] Int. Cl.² ..................................... H01M 10/48
[58] Field of Search ................................. 136/182

[56] References Cited
UNITED STATES PATENTS

| | | | |
|---|---|---|---|
| 664,008 | 12/1900 | Schoenmehl | 136/182 |
| 2,189,463 | 2/1949 | Eddy | 136/182 |
| 2,980,754 | 4/1961 | Reilly et al. | 136/182 |
| 3,563,806 | 2/1971 | Hruden | 136/182 |
| 3,773,563 | 11/1973 | Eaton | 136/182 |

*Primary Examiner*—Donald L. Walton
*Attorney, Agent, or Firm*—Kenyon & Kenyon Reilly Carr & Chapin

[57] ABSTRACT

Alkaline electrolyte electric primary cell comprising a visual indicator of its state of charge, the said primary cell having a negative electrode basically containing zinc powder in contact with its outside casing. The said charge indicator is constituted by a perforated copper or copper alloy sheet which is visible from the outside of the primary cell and is in contact with the negative mass. On assembly, the copper sheet becomes coated with a film of zinc and appears to have a grey color. During cell discharge the zinc of this film oxidizes and the original coloration of the sheet comes visible through a transparency provided in at least a portion of the casing. The sheet may be located at any selected depth in the thickness of the negative electrode and the time of restoration of original coloration is a function of the location depth and thus indicative of the residual state of charge.

6 Claims, 1 Drawing Figure

U.S. Patent   Nov. 16, 1976   3,992,228
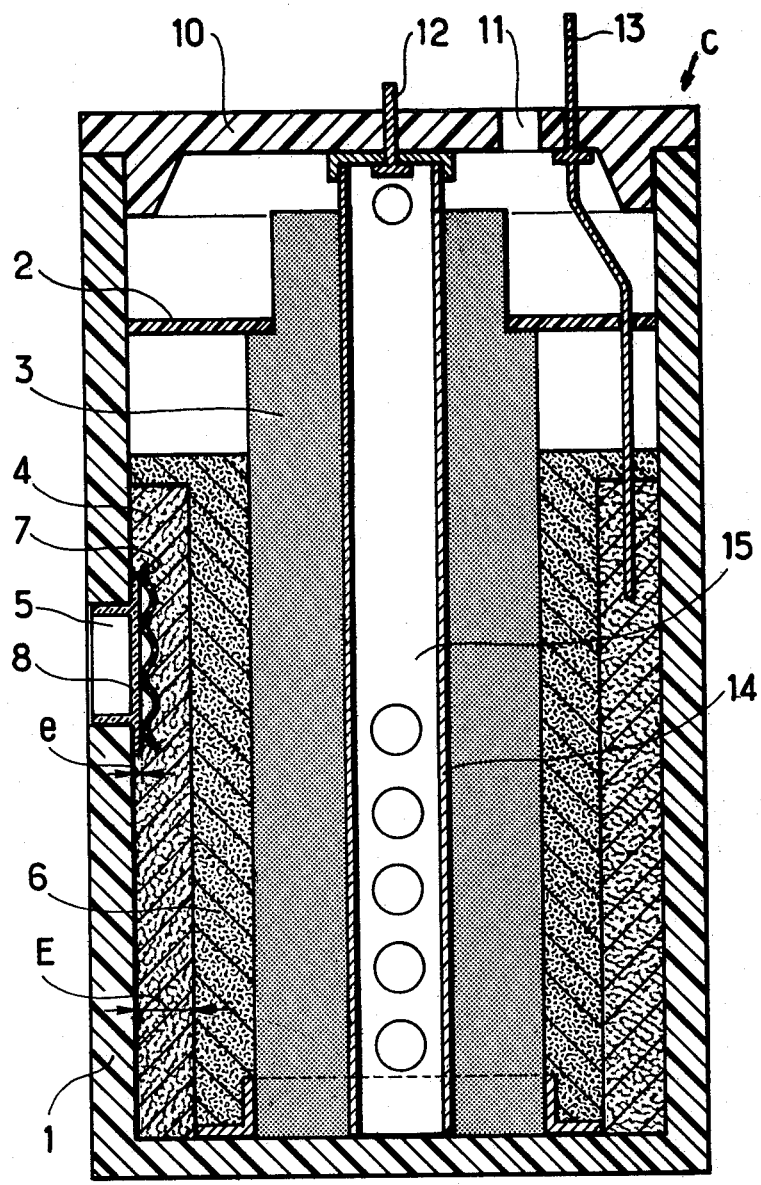

ELECTRIC PRIMARY CELL COMPRISING A VISUAL INDICATOR OF ITS STATE OF CHARGE

BACKGROUND AND BRIEF SUMMARY OF INVENTION

The present invention concerns an alkaline primary cell in which the negative active material is in the form of powdered zinc and more particularly a primary cell in which the negative electrode is arranged in contact with the casing of the cell and comprising a visual indicator of the state of charge.

It is often desirable for a user to know the state of charge of a primary cell, that is, the capacity remaining available in that primary cell at a determined moment. This is the case when the exhaustion of the primary batteries must be foreseen in advance or, even, when it is sought to detect the causes of a breakdown of a device fed by primary batteries.

U.S. Pat. No. 2,980,754 proposes, for that purpose, to provide a primary cell with an insulating layer, on the outside of the negative electrode, which changes appearance when it is reached by the leaking electrolyte at the end of the charge. That arrangement has the disadvantage of warning the user too late, since the electrolyte has already begun to leak.

Moreover, through French patent No. 71 48 012 of Dec. 21, 1971, published under No. 2,184,475, an air depolarization electric primary cell comprising an outside casing in which at least one transparent zone makes the discharge front of the negative electrode visible from outside, the negative active material being zinc powder in suspension in a gel, is known. Such observation is made possible by the fact that the active constituents of the cell are stacked orthogonally to the lateral wall of the envelope and hence that the discharge progresses substantially in a plane perpendicular to that wall. In a cylinder cell (cylinders, of course, include prisms which are cylinders with a polygonal directrix, as well as cylinders in the usual sense of the word, having a circular directrix) in which the active components are in the form of cylinders fitted into one another, even if the negative electrode has a peripheral position and the positive electrode has a central position, it is not possible to follow the discharge front according to the method used in the preceding patent, since the discharge front is represented by a cylindrical surface parallel to the internal surface of the negative electrode and is therefore invisible through the walls.

An aim of the present invention is to make it possible to observe the state of charge in such primary cells.

The present invention, therefore, has among its objects and features an electric primary cell comprising a negative electrode whose active material basically contains powdered zinc and which is situated in contact with the casing, at least in the vicinity of a transparent portion of the latter, an alkaline electrolyte and a positive electrode, the outside casing of the cell has at least one transparent portion through which a discharge indicator is visible from the outside; the latter being constituted by a perforated sheet made of a material chosen from the group comprising copper and its colored alloys, visible through the transparent portion and in contact with the negative active material impregnated with electrolyte. It is to be understood that perforated sheet means a wire gauze or an expanded metal sheet as well as a solid sheet perforated subsequently. As will be seen further on, when the color of the discharge indicator changes from grey to red or to yellow, this means that the discharge front of the active material has reached its level: consequently, the position of the copper sheet in the active negative material is chosen as a function of the position of the discharge front, that is, of the state of discharge which is to be observed. Such an arrangement also makes it possible to be warned of the approach of the end of discharge with a safety margin adapted to the use of the cell.

Other particularities, objects and advantages of the invention will become apparent from the following description which will be given with reference to the single accompanying FIGURE showing a longitudinal cross-section view of an air depolarization primary cell equipped with a charge indicator according to the invention.

DETAILED DESCRIPTION

This cell C which can have either a prismatic shape or the shape of a cylinder having a circular base, comprises a casing 1 made of plastic material closed by a lid 10 having a vent 11. Terminals 12 and 13 which are respectively positive and negative emerge from the lid 10.

The casing 1 contains a negative electrode 4 whose active mass is constituted by zinc powder in suspension in a suitable gel, for example, a gelled solution of potassium hydroxide. An electrolyte 6 constituted, for example, by a gelled solution of potassium hydroxide, completely covers the inner face and top face of the negative electrode so as to protect it against a possible arrival thereto of air and to prevent short circuits with the positive electrode during discharge. A closing plate 2 made, for example, of a plastic material engages the positive electrode 3 compelling it to assume a centralized position. The references 15 and 14 illustrate respectively the central aeration funnel and the current collector of the positive electrode 3, the collector being constituted by a perforated steel tube.

According to the invention, an opening 5 is formed in a portion of the lateral wall of the casing 1 adjacent to the negative electrode 4. A support 8 made of transparent plastic material, such as acrylonitrile styrene or crystal polystyrene, which bears on its internal face a sheet in the form of a disk 7 made of perforated and corrugated copper sheet adapted to be incrusted in the anode mass of the electrode 4 is positioned in that opening. At the time of assembly of the cell C, the copper disk 7 comes into contact with the active negative mass 4 and becomes covered with a film of zinc, thus changing its color by virtue of said film to grey. As the disk is corrugated, its face visible from the outside is not completely pressed against the support 8 engaging it only at crests of the corrugation and as it is perforated, that face also is covered with zinc in the same way as the face facing the inside of the cell. The whole disk thus has changed color from original copper red to grey. For clarity, in the drawing, the corrugations of the disk 7 have been considerably magnified in reality a disk having a thickness of 0.1 mm has, for example, a lateral bulk of 0.5 mm, and the thickness of the active negative mass being 7 to 10 mm. In the embodiment described, the perforations of the sheet 7 have been obtained, for example, by means of needles and are, therefore, very fine. During discharge, the front of transformation of the zinc in the mass into zinc oxide moves from the inner surface of the negative electrode and towards its outside surface in contact with casing 1.

At the moment when the oxidation front comes into contact with the copper disk 7, the zinc deposited on the copper disk also is oxidized. As a result, the red initial color of the copper plate 7 again appears. If the depth to which the copper disk 7 is sunk into the negative electrode 4 is called e, it can be said, when the outside face of the disk 7 has become red again, that the discharge front is situated at the level of a cylindrical surface distant front from the internal wall of the casing 1, by a distance e. If F designates the thickness of the negative mass, (E − e)/E designates the ratio of discharge which is detected. The value of e is therefore fixed as a function of the ratio of discharge which is required to be detected, for example, by making the support 8 slide inwardly inside the opening 5 to a desired value e prior to glueing it to edge of the opening.

By way of an example, for an air depolarization primary cell of 360 Ah rated capacity, a depth e substantially equal to a tenth of the thickness E was chosen and a change in color of the indicator was observed for a discharge at 335 Ah, this corresponding substantially to 9/10 of the actual capacity of the cell which was found to be equal to 365 Ah.

The disk 7 in the embodiment shown is corrugated, this making it possible to glue it or otherwise adhere by its crests at several points to the support 8 without pressing it flat against that support. However, disk 7 can be plane and fixed by any other suitable means. As has been said, the perforated sheet or disk 7 can be wire gauze woven or otherwise, expanded metal sheet, etc. The material of this disk 7 also can be a colored alloy of copper, such as brass, in which case the normal color is no longer red but yellow. When the disk is of brass, its yellow color reappears when the film of zinc on its transformation to zinc oxide during discharge occurs.

It must be understood that the embodiments shown and described hereinabove have been given only by way of an example. If a casing 1 were made of a transparent plastic material, it would not be necessary to form a window opening 5 and a transparent support 8, it then being possible to fix the copper disk 7 directly to the internal wall of the transparent casing. However, this arrangement of the components of the cell into cylinders (or prisms) fitted into one another is not necessary for the invention and a cell having, for example, the shape described in French patent No. 71 48 761, published under No. 2,185,725 could be fitted with such an indicator on the portion of its casing in contact with the zinc electrode, therefore, in this case its bottom.

Lastly, the described example shows an air depolarized primary cell, but an alkaline primary cell having a solid depolarizer such as manganese dioxide can also embody the indicator means according to the present invention. It is to be understood that variations in structural detail within the scope of the claims are contemplated. There is no intention, therefore, of limitation to the exact structure hereinabove described.

What is claimed is:

1. Electric primary cell comprising an outside casing having at least one transparent portion through which a discharge indicator is visible from outside of said casing through said transparent portion, a negative electrode whose active material basically contains powdered zinc impregnated with electrolyte, said negative electrode being situated in contact with the casing at least in the vicinity of a transparent portion of said casing, an alkaline electrolyte and a positive electrode in said cell, the said discharge indicator comprising a perforate sheet made of a material selected from the group consisting of copper and its colored alloys and positioned at any selected depth of the total thickness of said negative electrode so as to be visible externally through said transparent portion of said casing, said sheet being in contact with the negative active material impregnated with electrolyte and being thus coated with a film of zinc which film during discharge of the cell becomes converted to zinc oxide and in such conversion results in reappearance of the original color of said sheet visible through said transparent portion.

2. Electric primary cell according to claim 1, characterized in that the casing of the cell is a transparent plastic material.

3. Electric primary cell according to claim 1, characterized in that said transparent portion of the casing is an opening in said casing and a transparent support on which the sheet is fixed is mounted in said opening to close it off.

4. Electric primary cell according to claim 1, characterized in that the sheet is corrugated.

5. Electric primary cell according to claim 3 wherein said sheet is corrugated and wherein crests of said sheet only are fixed to said support.

6. Electric primary cell according to claim 1 wherein said cell is cylindrical, and said electrode and electrolyte are concentrically disposed in said casing.

* * * * *